United States Patent
Shuman et al.

(10) Patent No.: US 10,397,373 B2
(45) Date of Patent: Aug. 27, 2019

(54) RENEWING REGISTRATIONS FOR CLIENT APPLICATIONS INSTALLED ON DIFFERENT PROXIMATE CLIENT DEVICES

(71) Applicant: QUALCOMM Incorporated, San Diego, CA (US)

(72) Inventors: Mohammed Ataur Rahman Shuman, San Diego, CA (US); Amit Goel, San Diego, CA (US); Sandeep Sharma, San Diego, CA (US); Vijay Anandrao Suryavanshi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 523 days.

(21) Appl. No.: 14/717,596

(22) Filed: May 20, 2015

(65) Prior Publication Data
US 2016/0344845 A1 Nov. 24, 2016

(51) Int. Cl.
*H04L 29/06* (2006.01)
*H04L 29/08* (2006.01)
*H04W 8/02* (2009.01)

(52) U.S. Cl.
CPC .............. *H04L 67/42* (2013.01); *H04L 67/18* (2013.01); *H04W 8/02* (2013.01)

(58) Field of Classification Search
CPC ....... H04W 4/005; H04W 4/023; H04W 4/08; Y02B 60/44
See application file for complete search history.

(56) References Cited

U.S. PATENT DOCUMENTS

| 6,438,690 B1 | 8/2002 | Patel et al. |
| 7,761,571 B2 | 7/2010 | Bushmitch et al. |
| 8,054,780 B1 | 11/2011 | Manroa et al. |

(Continued)

FOREIGN PATENT DOCUMENTS

| WO | 2005034466 A1 | 4/2005 |
| WO | 2014162175 A1 | 10/2014 |

OTHER PUBLICATIONS

Roach A.B., "Registration for Multiple Phone Numbers in the Session Initiation Protocol (SIP)", Internet Engineering Task Force (IETF), Request for Comments: 6140, Mar. 2011, pp. 1-35.

(Continued)

*Primary Examiner* — William G Trost, IV
*Assistant Examiner* — Christopher P Cadorna
(74) *Attorney, Agent, or Firm* — Muncy, Geissler, Olds & Lowe, P.C.

(57) ABSTRACT

In an embodiment, a client device obtains a list of client devices registered in association with a particular client application, and then detects listed client device(s) as proximate via a local communications interface. One of the proximate client devices is identified as responsible for sending an aggregated registration request message for renewing their respective application registrations with a server. In another embodiment, the server receives a registration message for the client application from a client device and detects that at least one other registered client device for that client application is proximate to the requesting client device. The server attempts to preemptively renew the registrations for both the requesting client device and the at least one other registered client device based on the proximity detection.

15 Claims, 13 Drawing Sheets

(56) References Cited

U.S. PATENT DOCUMENTS

| | | | |
|---|---|---|---|
| 8,239,852 | B2 | 8/2012 | Etchegoyen |
| 8,271,663 | B2 | 9/2012 | Jayadevan et al. |
| 8,634,573 | B2 | 1/2014 | Igoe |
| 8,655,357 | B1 | 2/2014 | Gazzard et al. |
| 8,812,601 | B2 | 8/2014 | Hsieh et al. |
| 2010/0267364 | A1 | 10/2010 | Smith et al. |
| 2011/0185437 | A1* | 7/2011 | Tran ............... H04L 63/104 726/28 |
| 2013/0132937 | A1 | 5/2013 | Sung et al. |
| 2013/0288668 | A1 | 10/2013 | Pragada et al. |
| 2013/0318343 | A1 | 11/2013 | Bjarnason et al. |
| 2014/0120949 | A1* | 5/2014 | Gomyo ............ H04M 1/72569 455/456.1 |
| 2014/0122882 | A1* | 5/2014 | Leppanen ............ H04L 63/065 713/170 |
| 2014/0258367 | A1 | 9/2014 | Suryavanshi et al. |
| 2014/0342735 | A1 | 11/2014 | Liao |
| 2015/0017917 | A1 | 1/2015 | Guo et al. |
| 2015/0234832 | A1* | 8/2015 | Gardner, III ........ G06F 17/3053 707/749 |
| 2016/0227371 | A1* | 8/2016 | Wang ................ H04W 4/005 |

OTHER PUBLICATIONS

International Search Report and Written Opinion—PCT/US2016/025878—ISA/EPO—dated Sep. 22, 2016.

\* cited by examiner

RENEWING REGISTRATIONS FOR CLIENT APPLICATIONS INSTALLED ON DIFFERENT PROXIMATE CLIENT DEVICES

BACKGROUND

1. Field

Embodiments relate to renewing registrations for client applications installed on different proximate client devices.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data, Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

It is typical for client devices (e.g., mobile devices such as cell phones) that use the above-noted communication systems or other types of access networks (e.g., WiFi, etc.) to maintain registrations for client applications with one or more host servers. For example, a user may be logged into his/her Facebook account with a Facebook host server via a Facebook client application on his/her cellular phone, a Facebook client application on his/her tablet computer, a Facebook client application on his/her laptop or desktop computer, a Facebook client application on his/her smart TV, and so on. These client application registrations are typically temporary and require periodic renewals or else the client applications' will be deregistered by their respective host servers. It is also possible that two or more client applications maintain active registrations with the same host server. In this case, the respective devices that execute the two or more client applications will typically be required to transmit independent registration renewal requests for extending or renewing the registrations of the respective client applications.

SUMMARY

In an embodiment, a client device obtains a list of client devices registered in association with a particular client application, and then detects listed client device(s) as proximate via a local communications interface. One of the proximate client devices is identified as responsible for sending an aggregated registration request message for renewing their respective application registrations with a server. In another embodiment, the server receives a registration message for the client application from a client device and detects that at least one other registered client device for that client application is proximate to the requesting client device. The server attempts to preemptively renew the registrations for both the requesting client device and the at least one other registered client device based on the proximity detection.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
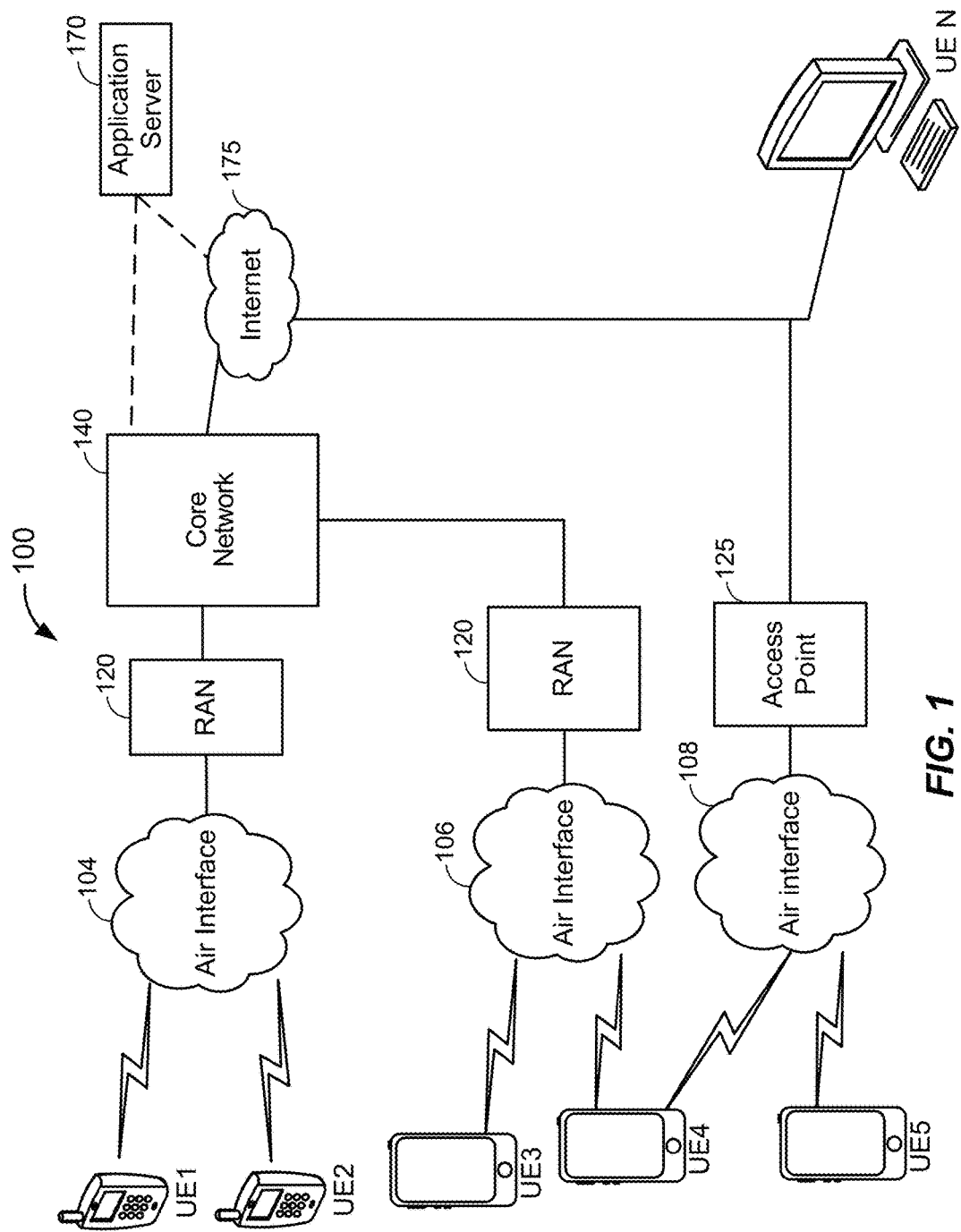
FIG. 1 illustrates a high-level system architecture of a wireless communications system in accordance with an embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the invention. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services (e.g., Voice-over-Internet Protocol (VoIP) sessions, Push-to-Talk (PTT) sessions, group communication sessions, social networking services, etc.) for UEs that can connect to the application server 170 via the core network 140 and/or the Internet 175, and/or to provide content (e.g., web page downloads) to the UEs.

Figure 2:
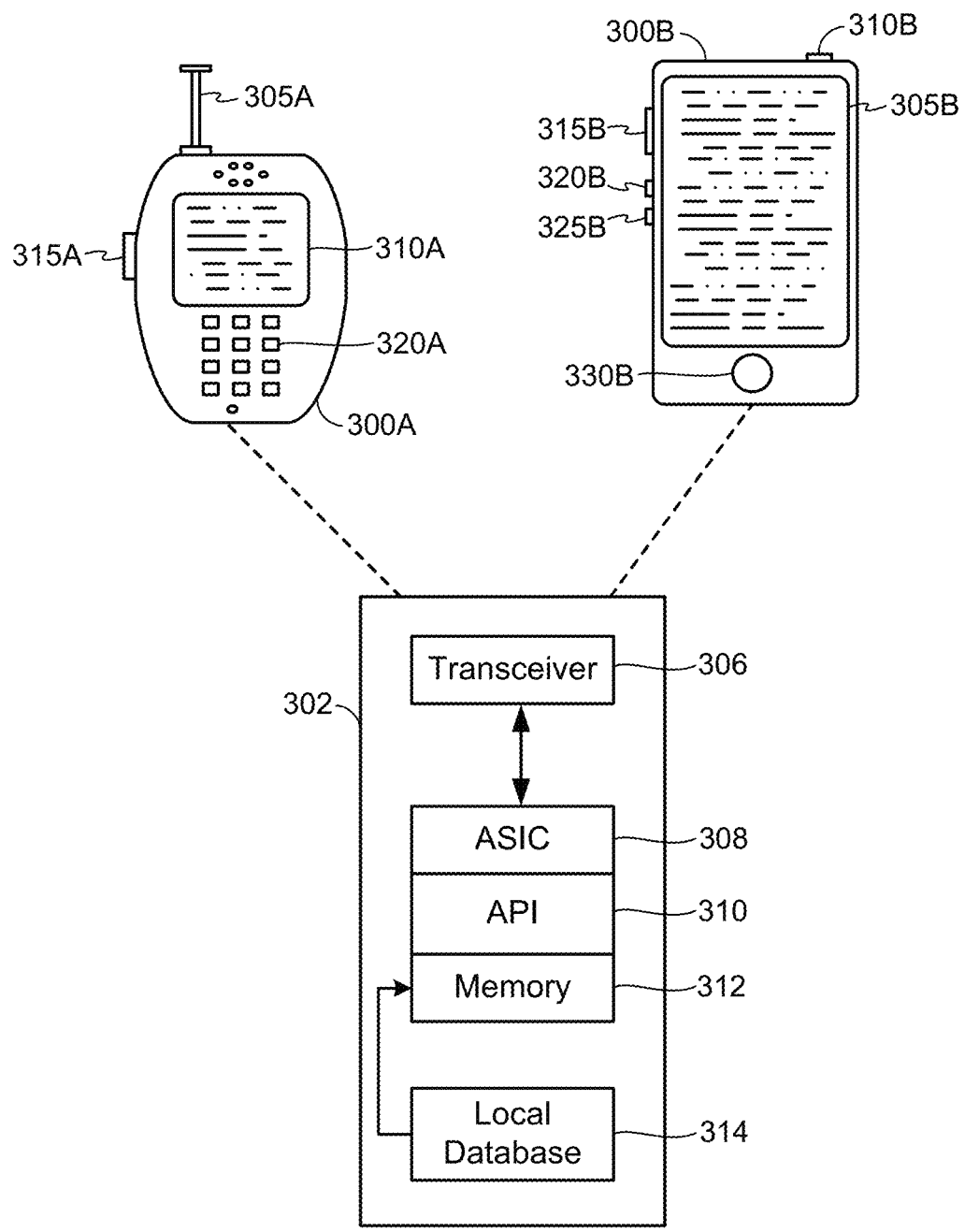
FIG. 2 illustrates examples of user equipments (UEs) in accordance with embodiments of the invention.

FIG. 2 illustrates examples of UEs (i.e., client devices) in accordance with embodiments of the invention. Referring to FIG. 2, UE 300A is illustrated as a calling telephone and UE 300B is illustrated as a touchscreen device (e.g., a smart phone, a tablet computer, etc.). As shown in FIG. 2, an external casing of UE 300A is configured with an antenna 305A, display 310A, at least one button 315A (e.g., a PTT button, a power button, a volume control button, etc.) and a keypad 320A among other components, as is known in the art. Also, an external casing of UE 300B is configured with a touchscreen display 305B, peripheral buttons 310B, 315B, 320B and 325B (e.g., a power control button, a volume or vibrate control button, an airplane mode toggle button, etc.), at least one front-panel button 330B (e.g., a Home button, etc.), among other components, as is known in the art. While not shown explicitly as part of UE 300B, the UE 300B can include one or more external antennas and/or one or more integrated antennas that are built into the external casing of UE 300B, including but not limited to WiFi antennas, cellular antennas, satellite position system (SPS) antennas (e.g., global positioning system (GPS) antennas), and so on.

While internal components of UEs such as the UEs 300A and 300B can be embodied with different hardware configurations, a basic high-level UE configuration for internal hardware components is shown as platform 302 in FIG. 2. The platform 302 can receive and execute software applications, data and/or commands transmitted from the RAN 120 that may ultimately come from the core network 140, the Internet 175 and/or other remote servers and networks (e.g., application server 170, web URLs, etc.). The platform 302 can also independently execute locally stored applications without RAN interaction. The platform 302 can include a transceiver 306 operably coupled to an application specific integrated circuit (ASIC) 308, or other processor, microprocessor, logic circuit, or other data processing device. The ASIC 308 or other processor executes the application programming interface (API) 310 layer that interfaces with any resident programs in the memory 312 of the wireless device. The memory 312 can be comprised of read-only or random-access memory (RAM and ROM), EEPROM, flash cards, or any memory common to computer platforms. The platform 302 also can include a local database 314 that can store applications not actively used in memory 312, as well as other data. The local database 314 is typically a flash memory cell, but can be any secondary storage device as known in the art, such as magnetic media, EEPROM, optical media, tape, soft or hard disk, or the like.

Accordingly, an embodiment of the invention can include a UE (e.g., UE 300A, 300B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 308, memory 312, API 310 and local database 314 may all be used cooperatively to load, store and execute the various functions disclosed herein and thus the logic to perform these functions may be distributed over various elements. Alternatively, the functionality could be incorporated into one discrete component. Therefore, the features of the UEs 300A and 300B in FIG. 2 are to be considered merely illustrative and the invention is not limited to the illustrated features or arrangement.

The wireless communication between the UEs 300A and/or 300B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 3:
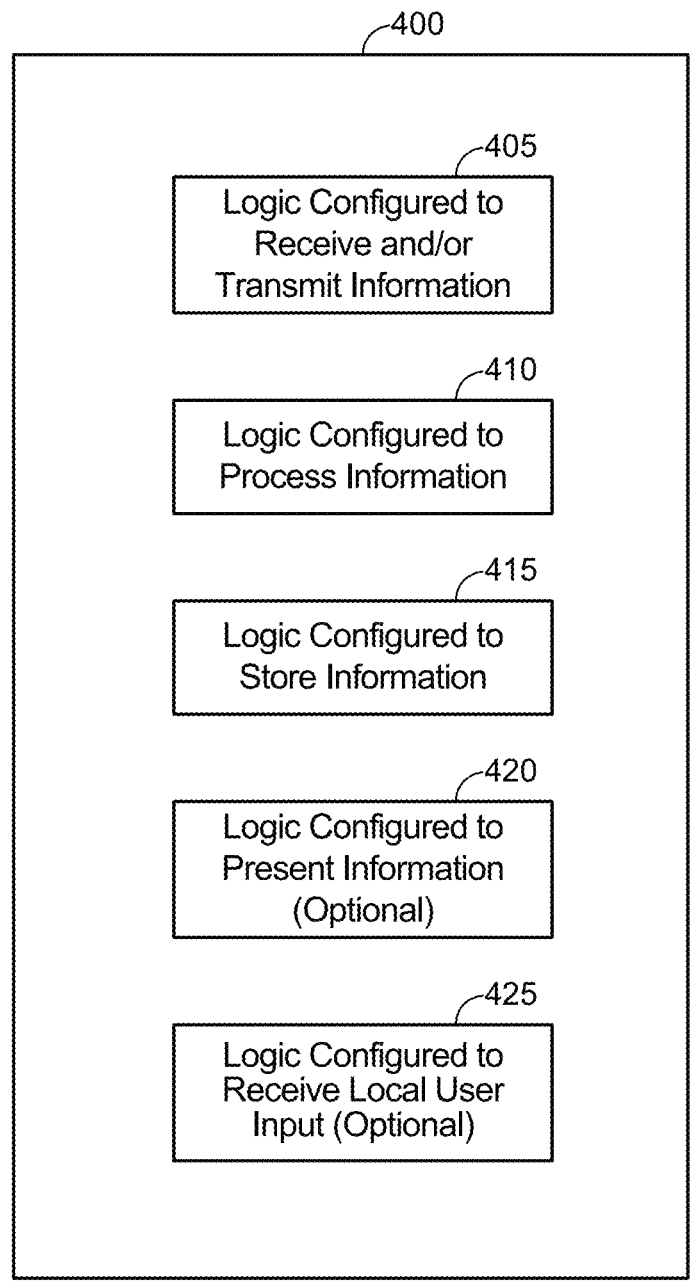
FIG. 3 illustrates a communication device that includes logic configured to perform functionality in accordance with an embodiment of the invention.

FIG. 3 illustrates a communication device 400 that includes logic configured to perform functionality. The communication device 400 can correspond to any of the above-noted communication devices, including but not limited to UEs 300A or 300B, any component of the RAN 120, any component of the core network 140, any components coupled with the core network 140 and/or the Internet 175 (e.g., the application server 170), and so on. Thus, communication device 400 can correspond to any electronic device that is configured to communicate with (or facilitate communication with) one or more other entities over the wireless communications system 100 of FIG. 1.

Referring to FIG. 3, the communication device 400 includes logic configured to receive and/or transmit information 405. In an example, if the communication device 400 corresponds to a wireless communications device (e.g., UE 300A or 300B, AP 125, a BS, Node B or eNodeB in the RAN 120, etc.), the logic configured to receive and/or transmit information 405 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., the application server 170, etc.), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 3, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 3, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 3, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 300A or UE 300B as shown in FIG. 2, the logic configured to present information 420 can include the display 310A of UE 300A or the touchscreen display 305B of UE 300B. In a further example, the logic configured to present information 420 can be omitted for certain communication devices, such as network communication devices that do not have a local user (e.g., network switches or routers, remote servers such as the application server 170, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 3, the communication device 400 further optionally includes logic configured to receive local user input 425. In an example, the logic configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 300A or UE 300B as shown in FIG. 2, the logic configured to receive local user input 425 can include the keypad 320A, any of the buttons 315A or 310B through 325B, the touchscreen display 305B, etc. In a further example, the logic configured to receive local user input 425 can be omitted for certain communication devices, such as network communication devices that do not have a local user (e.g., network switches or routers, remote servers such as the application server 170, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 3, while the configured logics of 405 through 425 are shown as separate or distinct blocks in FIG. 3, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

It is typical for client devices (e.g., mobile devices such as cell phones) that use the above-noted communication systems or other types of access networks (e.g., WiFi, etc.) to maintain registrations for client applications with one or more host servers. For example, a user may be logged into his/her Facebook account with a Facebook host server via a Facebook client application on his/her cellular phone, a Facebook client application on his/her tablet computer, a Facebook client application on his/her laptop or desktop computer, a Facebook client application on his/her smart TV, and so on. These client application registrations are typically temporary and require periodic renewals or else the client applications' will be deregistered by their respective host servers. It is also possible that two or more client applications maintain active registrations with the same host server. In this case, the respective devices that execute the two or more client applications will typically be required to transmit independent registration renewal requests for extending or renewing the registrations of the respective client applications.

Figure 4:
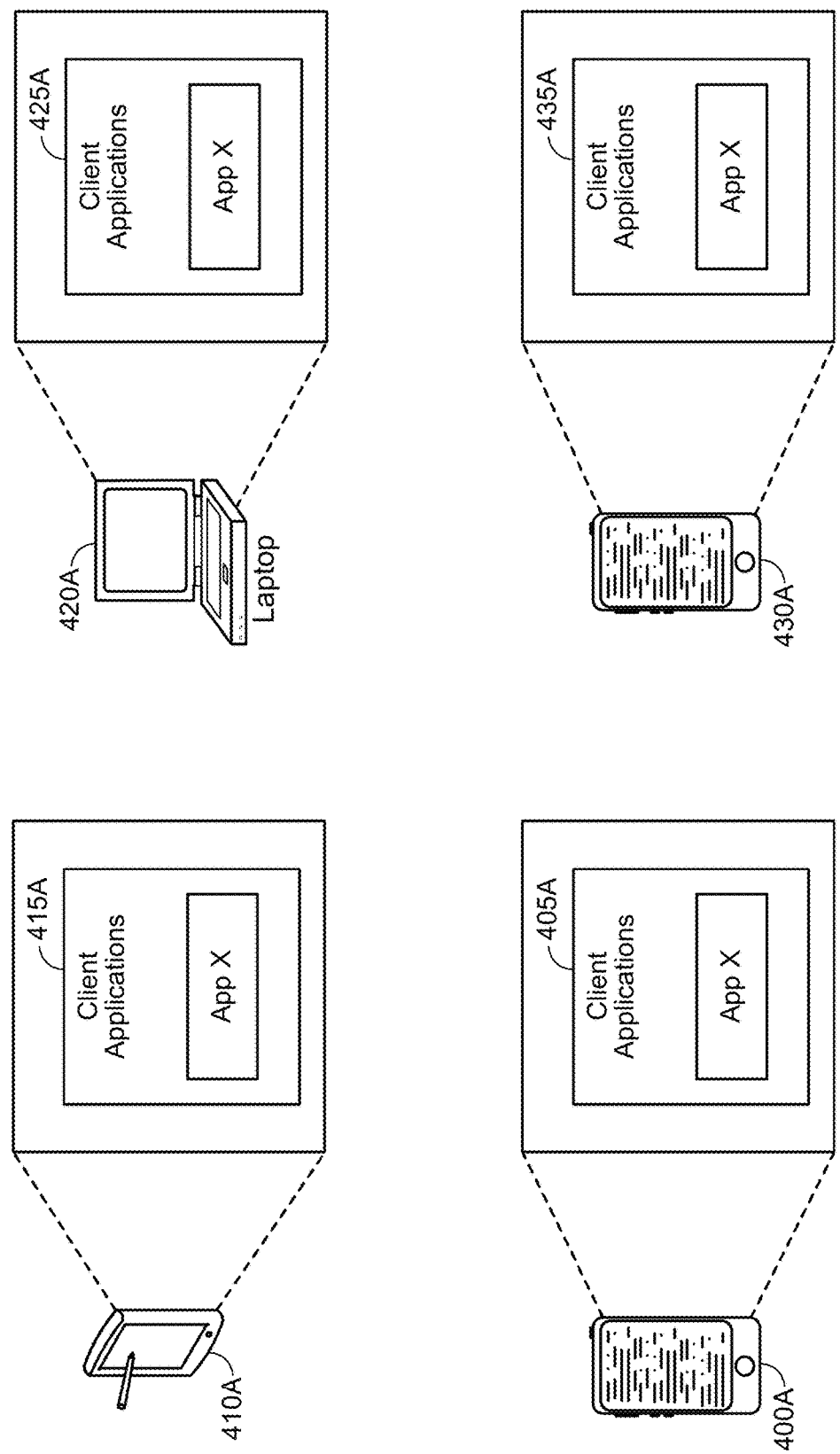
FIG. 4 illustrates application configurations within client devices that are registered in association with a given user in accordance with an embodiment of the invention.

FIG. 4 illustrates application configurations within client devices that are registered in association with a given user ("User A") in accordance with an embodiment of the invention. Referring to FIG. 4, assume that User A controls client device 400A (e.g., a cellular telephone or handset), client device 410A (e.g., a tablet computer), client device 420A (e.g., a laptop computer) and client device 430A (e.g., another cellular telephone or handset). Each of client devices 400A, 410A, 420A and 430A are configured to execute a set of client applications 405A, 415A, 425A and 435A, respectively. In particular, a client application X ("App X") is included among each of the respective sets of client applications 405A, 415A, 425A and 435A. While App X is referred to as being installed on the respective client devices, in actuality different versions of App X can be installed. For example, a handset version of App X can be included among the set of client applications 405A and 435A, a tablet version of App X can be included among the set of client applications 415A, and a laptop version of App X can be included among the set of client applications 425A. Accordingly, different device user interfaces, form factors and/or operating systems may necessitate different versions of App X. Further, different versions of App X can be installed on devices that have similar configurations (e.g., handset devices 1 and 2 have the same physical configuration and may each have App X installed, but a user of device 2 does not upgrade App X as upgrades are released such that a higher or more up-to-date version of App X is running on device 1, etc.). As discussed below in more detail, a server which is responsible for registering App X is capable of associating each App X instance with User A, irrespective of potential version differences at the respective devices undergoing registration.

Figure 5:
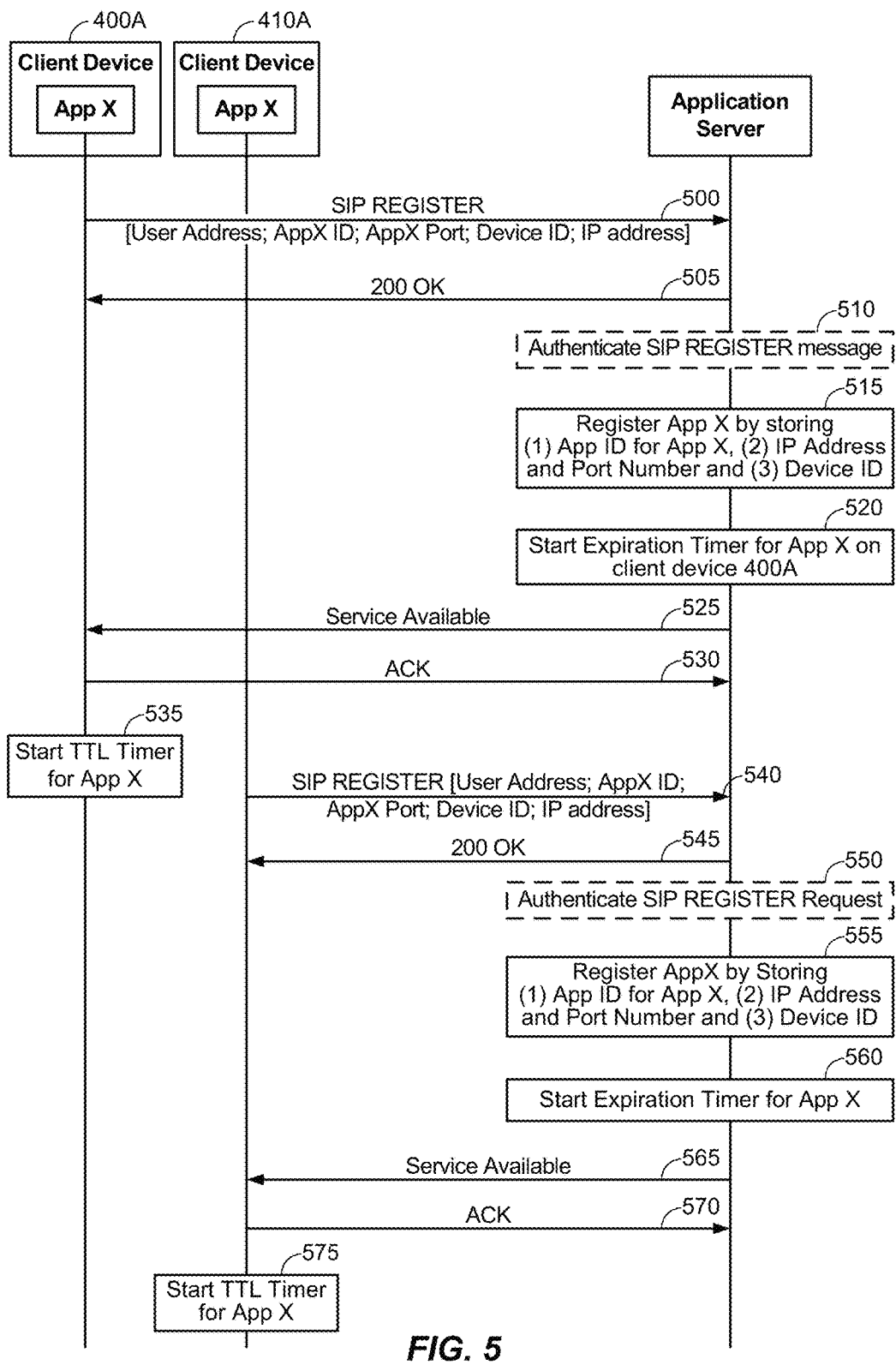
FIG. 5 illustrates an example registration procedure that can be implemented for a given client application on respective client devices as shown in FIG. 4.

FIG. 5 illustrates an example registration procedure that can be implemented for App X on client devices 400A and 410A, respectively, as shown in FIG. 4. In FIG. 5, it is assumed that App X is configured to be supported by and registered with the same host server ("application server 170"). However, this assumption is not necessarily true for other client applications deployed on client devices 400A and/or 410A.

Referring to FIG. 5, client device 400A transmits a registration message to the application server 170, 500. In FIG. 5, the registration message of 500 is shown as implemented via a Session Initiation Protocol (SIP) REGISTER message that includes a user address identifying the associated user for the registration, an App X identifier (ID), an IP address and port number used by App X on the client device 400A, a device identifier (ID) of the client device 400A. In an example, the port number used by App X may be unique to App X, while the IP address used by App X can also be shared with other client applications running on the client device 400A so that the client applications can be distinguished by their port number. The application server can thereby use the IP address in conjunction with App X's port number to route messages from external devices to App X on the client device 400A. In an example, the App X ID may be implemented as a globally unique ID that distinguishes App X from other client applications. In this case, any other client device with any version of App X installed can use the same App X ID for App X, while version information may optionally be indicated via a separate field of the registration message. In an alternative example, the App X ID may include multiple globally unique App X IDs that are each associated with a different version of App X (e.g., a tablet version of App X may have a first App X ID, a desktop version of App X may have a second App X ID, a Smart TV version of App X may have a third App X ID, and so on). In this case, the separate field for indicating the version information via the registration message is not necessary. Also, the device ID can correspond to a globally unique identifier for the client device 400A that distinguishes client device 400A from any other client device, such as a MAC address. For convenience of explanation, the registration messages described throughout this application will refer to SIP REGISTER messages in accordance with SIP, but it will be appreciated that other embodiments can be directed to non-SIP implementations.

Referring to FIG. 5, at 505, the application server 170 acknowledges (ACKs) the SIP REGISTER message from 500 by sending a 200 OK message to App X on the client device 400A based on the IP address of the client device 400A and App X's port number from the SIP REGISTER message of 500. Also, in response to the SIP REGISTER message from 500, the application server 170 optionally authenticates App X's SIP REGISTER message, 510. If the SIP REGISTER message from 500 is properly authenticated at 510 (or if authentication is skipped), the application server 170 registers App X by establishing a record for App X in association with the user identified by the user address that includes (i) App X's ID, (ii) the IP address and port number associated with App X, and (iii) the device ID associated with the client device 400A, 515. The application server 170 also starts an expiration timer for the registration of App X, 520, whereby the application server 170 is configured to de-register App X upon expiration of App X's expiration timer.

The application server 170 sends a message to App X on the client device 400A that indicates service is available for App X, 525, and App X sends an ACK in response to the service available message, 530. In an example, the service available message 525 contains an authentication key that is valid until App X's current period of registration on client device 400A is expired. At 535, App X starts a time to live (TTL) timer that is configured to expire before the expiration timer for App X that is running at the application server 170 for client device 400A. Expiration of App X's TTL timer will trigger App X on the client device 400A to transmit another SIP REGISTER message for renewing or extending App X's registration with the application server 170 by resetting App X's expiration timer for client device 400A.

At some later point in time, App X on client device 410A transmits a SIP REGISTER message 540 to the application server which includes the user address identifying the associated user for the registration, an App X ID, the IP address and port number used by App X on the client device 410A and the device ID of the client device 410A. At 545, the application server 170 ACKs the SIP REGISTER message from 540 by sending a 200 OK message to App X on the client device 410A based on the IP address of the client device 410A and App X's port number from the SIP REGISTER message of 540. Also in response to the SIP REGISTER message from 540, the application server 170 optionally authenticates App X's SIP REGISTER message, 550. If the SIP REGISTER message from 540 is properly authenticated at 550 (or if authentication is skipped), the application server 170 registers App X by establishing a record for App X in association with the user identified by the user address that includes (i) App X's ID, (ii) the IP address and port number associated with App X, and (iii) the device ID associated with the client device 410A, 555. The application server 170 also starts an expiration timer for the registration of App X on client device 410A, 560, whereby the application server 170 is configured to de-register App X on client device 410A upon expiration of App X's expiration timer.

The application server 170 sends a message to App X on the client device 410A that indicates service is available for App X, 565, and App X sends an ACK in response to the service available message, 570. In an example, the service available message 565 contains an authentication key that is valid until App X's current period of registration on client device 410A is expired. At 575, App X on client device 410A starts a TTL timer that is configured to expire before the expiration timer for App X that is running at the application server 170. Expiration of App X's TTL timer on client device 410A will trigger App X on client device 410A to transmit another SIP REGISTER message for renewing or extending App X's registration on client device 410A with the application server 170 by resetting App X's expiration timer.

Figure 6:
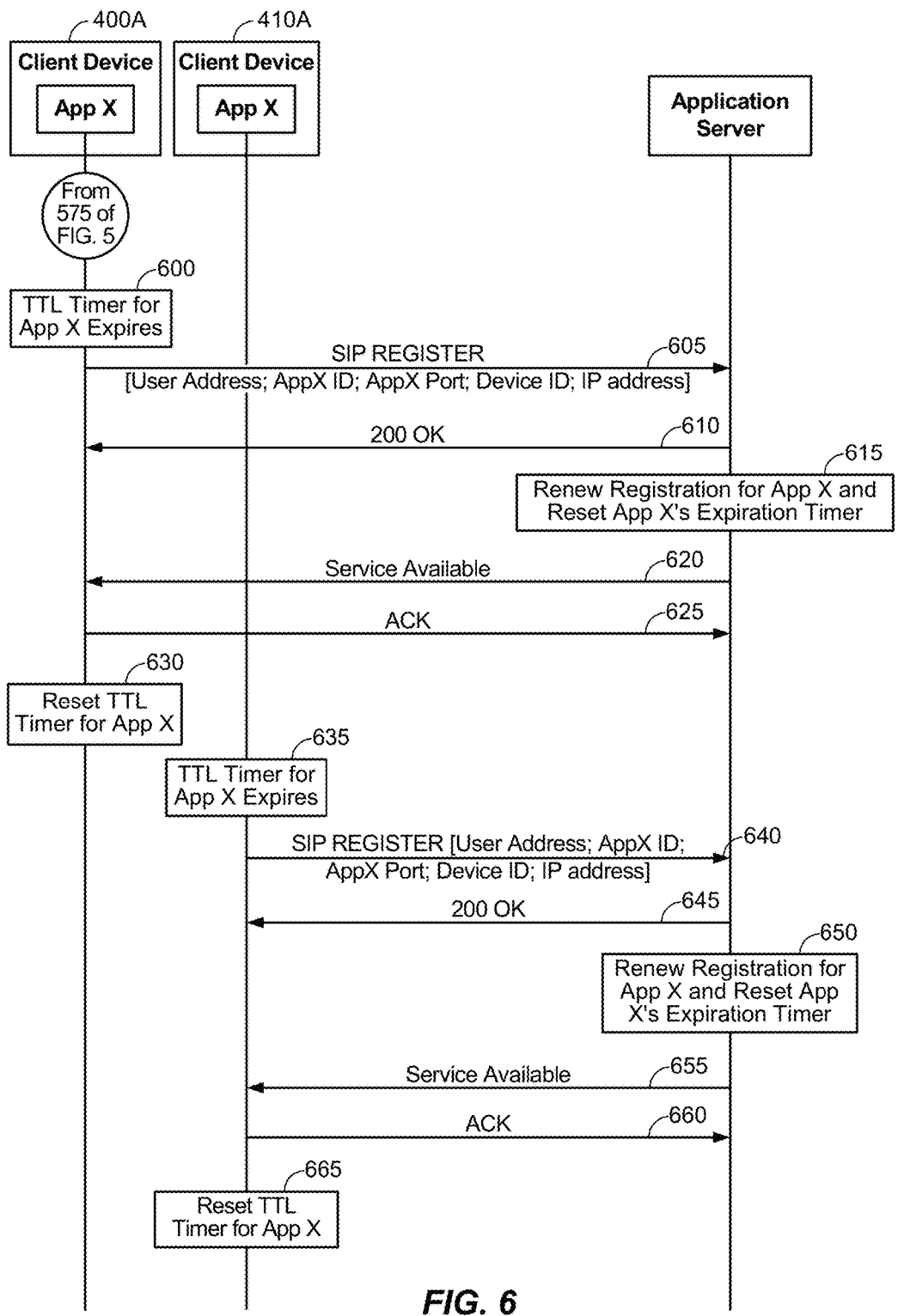
FIG. 6 illustrates a conventional mechanism for renewing or extending the registrations for the given client application on the respective client devices after execution of the process of FIG. 5.

FIG. 6 illustrates a conventional mechanism for renewing or extending the registrations for App X on client devices 400A and 410A after execution of the process of FIG. 5. Referring to FIG. 6, at some point after 575, the client device 400A determines that App X's TTL timer which was started at 535 has expired, 600. This triggers the client device 400A to transmit another SIP REGISTER message at 605 that functions to request the application server 170 to extend or renew App X's registration for client device 400A with the application server 170. The application server 170 ACKs the SIP REGISTER message from 605 with a 200 OK message, 610, and the application server 170 also renews the registration for App X for client device 400A by resetting or extending App X's expiration timer, 615. As will be appreciated, the operation of 615 pushes back the point in time at which App X's registration on client device 400A would otherwise expire. The application server 170 notifies App X on client device 400A that its registration has been renewed by sending a service available message with an updated authentication key, 620, and client device 400A ACKs the service available message, 625. App X on client device 400A resets or restarts the App X TTL timer at 630, such that client device 400A will send another SIP REGISTER message for renewing App X's registration with the application server 170 the next time the App X TTL timer expires on client device 400A, and so on.

Referring to FIG. 6, the client device 410A determines that App X's TTL timer has expired, 635. This triggers the client device 410A to transmit another SIP REGISTER message at 640 that functions to request the application server 170 to extend or renew App X's registration with the application server 170 for client device 410A. The application server 170 ACKs the SIP REGISTER message from 640 with a 200 OK message, 645, and the application server 170 also renews the registration for App X on client device 410A by resetting or extending App X's expiration timer, 650. As will be appreciated, the operation of 650 pushes back the point in time at which App X's registration for client device 410A would otherwise expire. The application server 170 notifies App X on client device 410A that its registration has been renewed by sending a service available message with an updated authentication key, 655, and client device 410A ACKs the service available message, 660. App X on client device 410A resets or restarts the App X TTL timer at 665, such that client device 410A will send another SIP REGISTER message for renewing App X's registration for client device 410A with the application server 170 the next time the App X TTL timer expires, and so on.

It is becoming more common for users to install the same client application on multiple client devices which are proximate to each other. For example, a particular user may have various versions of a client application for streaming video content (e.g., Netflix, YouTube, etc.) installed on several proximate client devices in a home environment, such as smart TVs, cellular phones, tablet computers and/or laptop or desktop computers in the home environment. The conventional approach shown in FIG. 6 whereby each client application on each respective client device independently engages in its own registration renewal procedure can be wasteful in terms of resource usage when multiple versions of the same client application are installed on proximate client devices. Accordingly, embodiments of the invention relate to reducing the amount of messaging used to renew registrations for a given client application installed onto multiple proximate client devices in association with the same user by consolidating or aggregating registration renewal requests for different the multiple proximate client devices into a single transmission.

Figure 7:
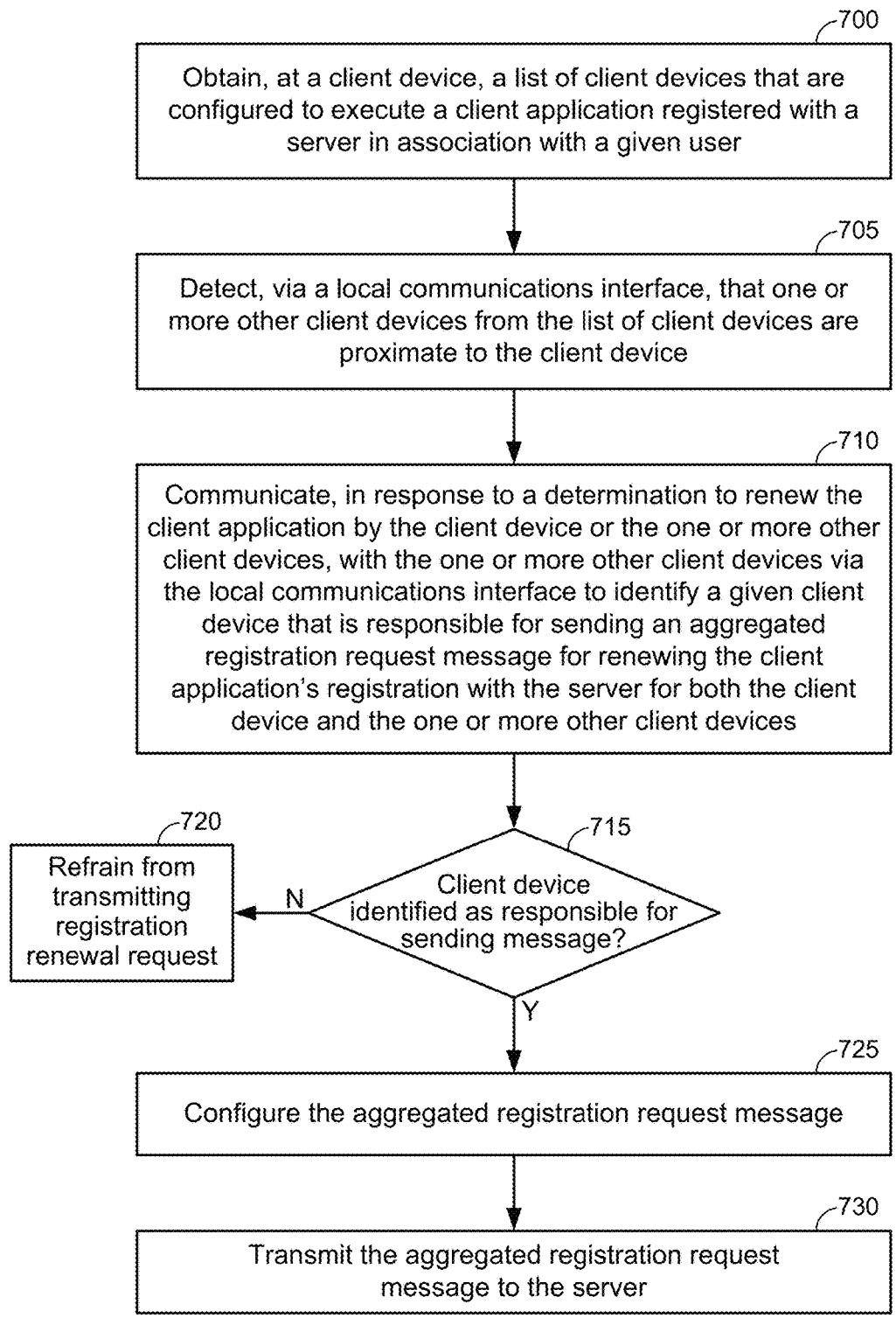
FIG. 7 illustrates a process of operating a client device in accordance with an embodiment of the invention.

FIG. 7 illustrates a process of operating a client device (e.g., such as client device 400A, 410A, 420A or 430A) in accordance with an embodiment of the invention. Referring to FIG. 7, at 700, the client device obtains a list of client devices to which a client application (e.g., App X) is registered with a server in association with a given user (e.g., each client application instance is registered to the same user address at the application server). As used herein, the "client application" for which each listed client device is configured to execute is associated with the same underlying service (e.g., Facebook, Netflix, etc.) but can vary by version. For example, a desktop computer, a handset device and a Smart TV may each execute a different version of the client application, but each of these devices would be listed in the list obtained at 700.

Referring to FIG. 7, the client device detects, via a local communications interface (e.g., a peer-to-peer interface, a Bluetooth interface, a WiFi-Direct interface, an LTE-D interface, etc.) that one or more other client devices from the list of client devices are proximate to the client device, 705. For example, the list of client devices obtained at 700 can include identifying information (e.g., device ID such as MAC ID, IP address, SSID, etc.) for each listed client device, whereby each listed client device is expected to periodically broadcast its respective identifying information over the local communications interface, and the client device can monitor the local communications interface to detect whether any listed client devices are proximate. Likewise, the client device can also periodically broadcast its own identifying information over the local communications interface to facilitate detection at the listed client devices.

As used herein, the "local communications interface" can correspond to any communicative path that can be bridged between different client devices without involving the application server. This includes any direct (or point-to-point) communications interface, such as direct P2P, Bluetooth, WiFi-Direct, LTE-D and so on, and can also include indirect communications interfaces such as indirect P2P mediated by an access point, and so on. The local communications interface is thereby any interface upon which communication can occur with less overhead relative to communications that are mediated by the application server, such that aggregating messages to the application server while using the local communications interface to relay messages in an indirect manner to/from the server provides benefits in terms of system resource utilization. Further, the term "proximate" as used herein refers to the expected or actual capacity of two or more client devices to communicate via the local communications interface. For example, two client devices with Bluetooth capability may be deemed proximate if the two client devices are 5 feet away from each other even if no actual Bluetooth connection currently exists between the two client devices (i.e., proximate by virtue of expected communication capacity). Likewise, two client devices with an established LTE-D connection may be deemed proximate by virtue of the established LTE-D connection (i.e., proximate by virtue of actual communication capacity). Therefore, the bounds of what constitutes "proximate" client devices in terms of physical distance can vary by the interface type (e.g., 10-30 feet for Bluetooth, several hundred meters for LTE-D, and so on).

Referring to FIG. 7, at 710, a determination is made by either the client device or the one or more other client devices detected at 705 to renew a respective client application installed thereon. In an example, this determination can trigger a search over the local communications interface which results in the detection of 705, although the detection of 705 can also occur as a periodic or background process that is not directly triggered by an imminent registration renewal procedure. In response to this determination, instead of merely transmitting a registration renewal request that requests registration renewal for the client application on one particular client device as in FIG. 6, the client device and the one or more other client devices detected at 705 communicate in order to identify a given client device that is responsible for sending an aggregated registration request message for renewing the client application's registration with the server for both the client device and the one or more other client devices, 710. For example, the communication at 710 can be used to implement a device selection protocol that is based on one or more device selection rules. For example, the one or more device selection rules can include selecting a plugged-in device over a battery-powered device so as to conserve battery power, selecting a WiFi-connected device over a cellular-connected device to reduce cellular congestion, selecting a device with the most imminent TTL timer expiration time for App X, or any combination thereof.

At 715, the client device determines whether the client device is identified as responsible for sending the aggregated registration request message at 710. If the client device is not identified as responsible for sending the aggregated registration request message at 710, then the client device refrains from transmitting a registration renewal request for App X based on the expectation that another client device will be transmitting the aggregated registration request message, 720. Otherwise, if the client device is identified as responsible for sending the aggregated registration request message at 710, the client device configures the aggregated registration request message, 725, and then transmits the aggregated registration request message to the application server, 730. As will be appreciated, reducing the number of proximate client devices that are required to transmit App X registration renewal requests limits physical-layer interference and/or backhaul congestion on the associated network(s).

Figure 8:
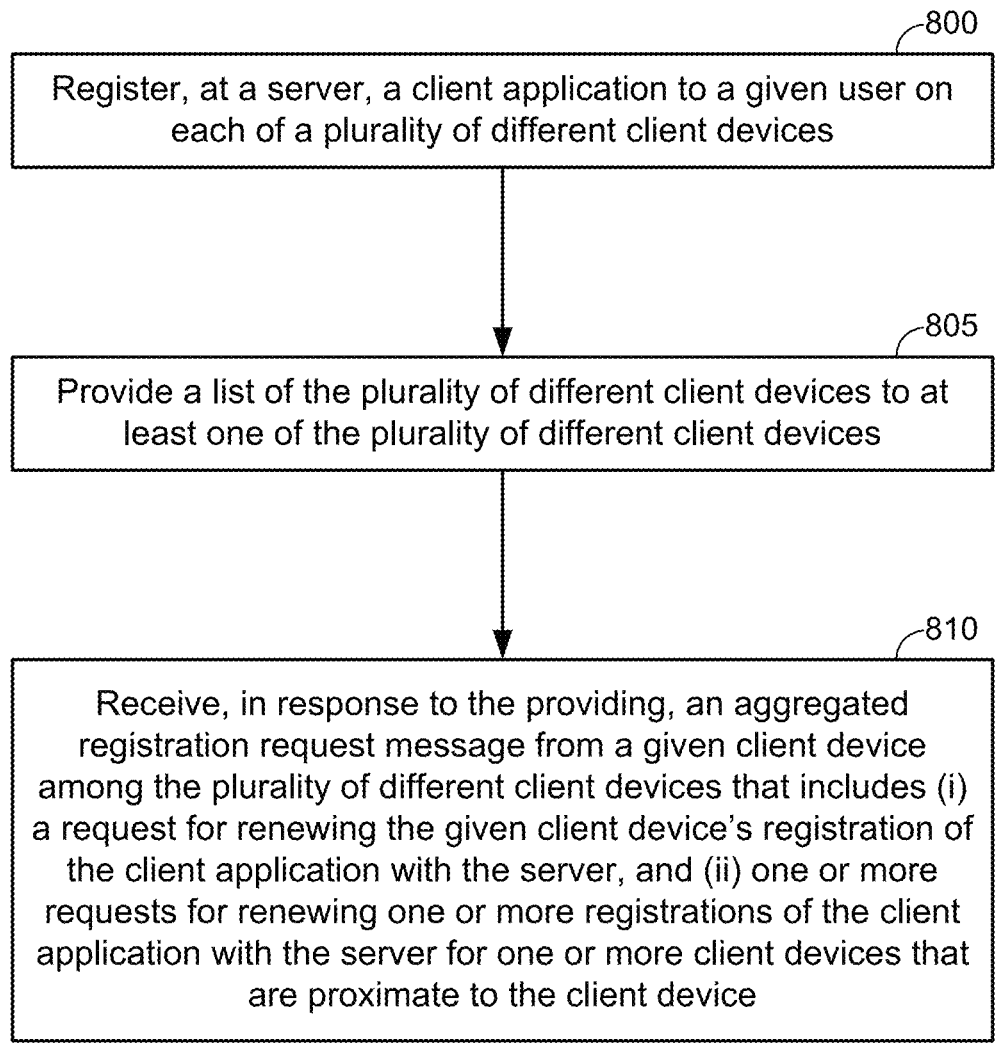
FIG. 8 illustrates a process of operating a server in accordance with an embodiment of the invention.

FIG. 8 illustrates a process of operating a server (e.g., such as application server 170) in accordance with an embodiment of the invention. In particular, FIG. 8 illustrates server-side operations that are performed in conjunction with the client-side operations described above with respect to FIG. 7.

Referring to FIG. 8, at 800, the server registers a client application to a given user on each of a plurality of different client devices. The server provides a list of the plurality of different client devices to at least one of the plurality of different client devices, 805. For example, the server can provide the list of 805 during registration of the client application on a new client device for the given user, or at some later point in time. The server can provide an updated list to currently registered client devices whenever a client device registers or de-registers the client application for the given user, or in a periodic manner. In a further example, the server itself need not propagate the list of 805 to each registered client device. For example, if two registered client devices are proximate and are connected via a local communications interface (e.g., P2P, Bluetooth, WiFi Direct, LTE-D, etc.), the server can provide the list to one of the registered client devices which can then relay the list to the other proximate client device.

At 810, in response to the list provisioning of 805, the server receives an aggregated registration request message from a given client device among the plurality of different client devices that includes (i) a request for renewing the given client device's registration of the client application with the server, and (ii) one or more requests for renewing one or registrations of the client application with the server for one or more other client devices that are proximate to the client device.

Figure 9:
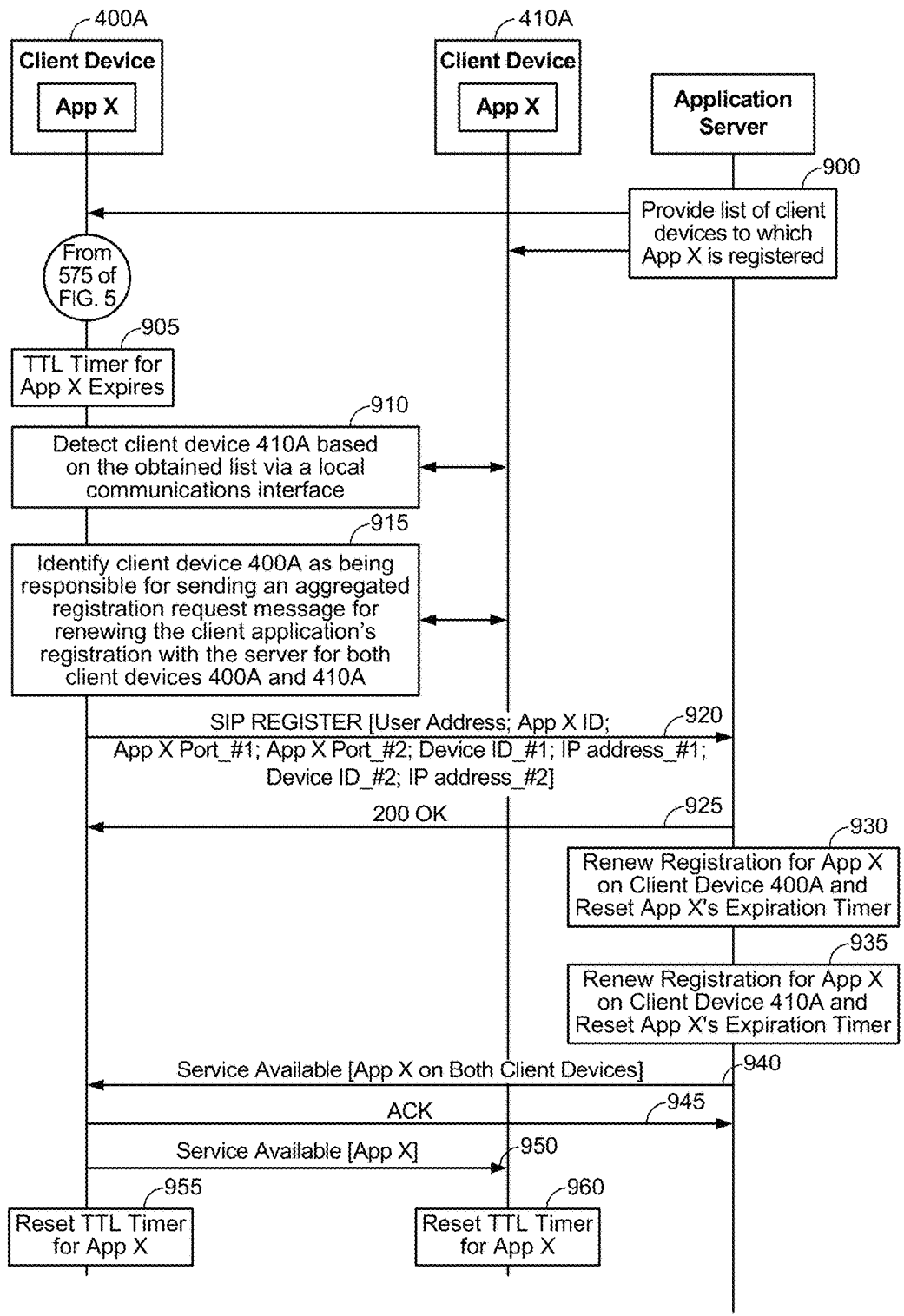
FIG. 9 illustrates an example implementation of the processes of FIGS. 7 and 8 as a continuation of the process of FIG. 5 in accordance with an embodiment of the present invention.

FIG. 9 illustrates an example implementation of the processes of FIGS. 7 and 8 performed with respect to client device 400A and 410A of FIG. 4 as a continuation of the process of FIG. 5 in accordance with an embodiment of the present invention. In the embodiment of FIG. 9, it is assumed that client devices 400A and 410A are proximate to each other. Referring to FIG. 9, the application server provides client devices 400A and 410A with a list of client devices to which App X is registered for User A, 900 (e.g., as in 700 of FIG. 7 or 805 of FIG. 8). The provisioning of 900 can occur before, after or during the process of FIG. 5.

Referring to FIG. 9, at some point after 575, the client device 400A determines that App X's TTL timer which was started at 535 has expired, 905. Instead of transmitting another SIP REGISTER message as at 605 of FIG. 6, the client device 400A detects client device 410A via the local communications interface using identifying information for the client device 410A that is provided in the list of 900, 910 (e.g., as in 705 of FIG. 7). Client devices 400A and 410A then communicate with each other to identify which client device is going to be responsible for transmitting an aggregated registration request message for renewing both of their respective App X registrations with the server, 915 (e.g., as in 710 of FIG. 7). In the embodiment of FIG. 9, it is assumed that client device 400A is identified as the responsible client device.

At 920 (e.g., as in 730 of FIG. 7 or 805 of FIG. 8), client device 400A configures and sends the aggregated registration request message which includes the user address ("User Address") identifying the associated user for the registration, the App X ID ("App X ID"), the IP address and port number used by App X both client devices 400A ("IP address_#1" and "App X Port_#1") and 410A ("IP address_#2" and "App X Port_#2"), the device IDs of both client devices 400A ("Device ID_#1") and 410A ("Device ID_#2"). At 925, the application server 170 ACKs the SIP REGISTER message from 920 by sending a 200 OK message to App X on the client device 400A based on the IP address of the client device 410A and App X's port number from the SIP REGISTER message of 920. In response to the SIP REGISTER message from 920, the application server renews App X registrations for both client devices 400A and 410A, 930 and 935.

In the embodiment of FIG. 9, the application server 170 notifies App X on client device 400A that App X registrations for both client devices 400A and 410A have been renewed by sending a service available message with updated authentication keys for both client devices 400A and 410A, 940, and client device 400A ACKs the service available message, 945. In response to the service available message, client device 400A notifies App X on client device 410A that its registration has also been renewed by forwarding the service available message to client device 410A with the updated authentication key for App X on client device 410 via the local communications interface, 950. App X on client device 400A resets or restarts the App X TTL timer, 955, and App X on client device 410A similarly resets or restarts its own App X TTL timer, 960.

Figure 10:
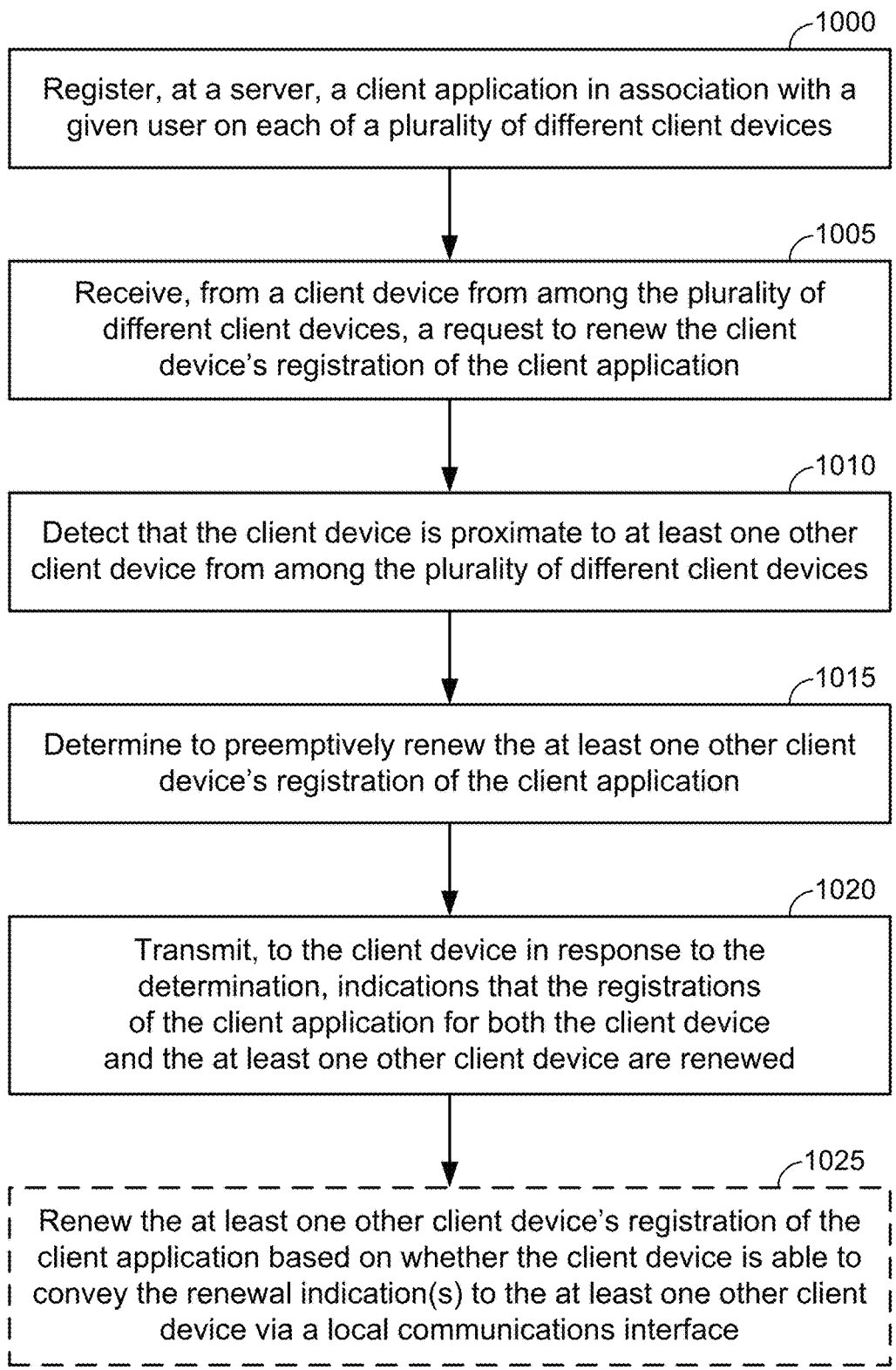
FIG. 10 illustrates a process of operating a server in accordance with an embodiment of the invention.
Figure 11:
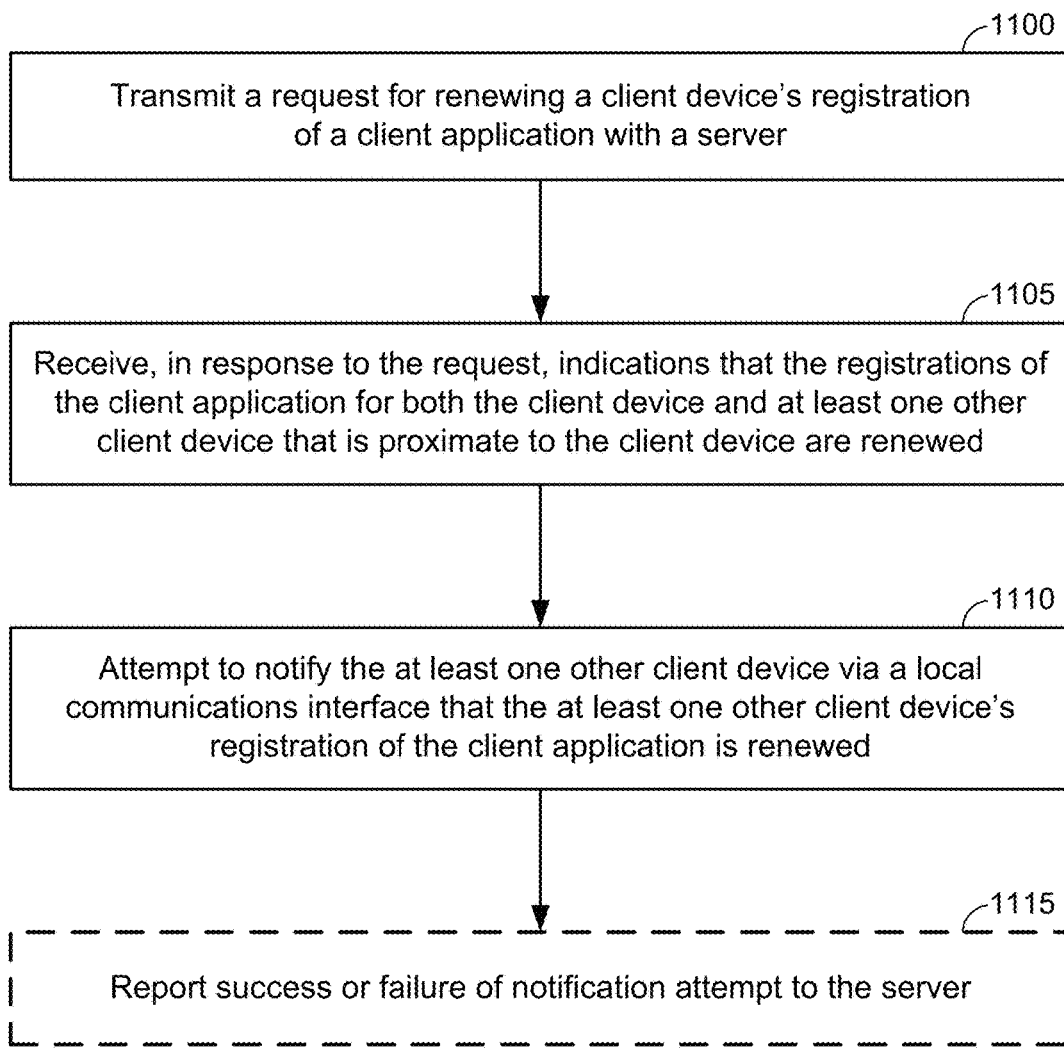
FIG. 11 illustrates a process of operating a client device in accordance with an embodiment of the invention.
Figure 12:
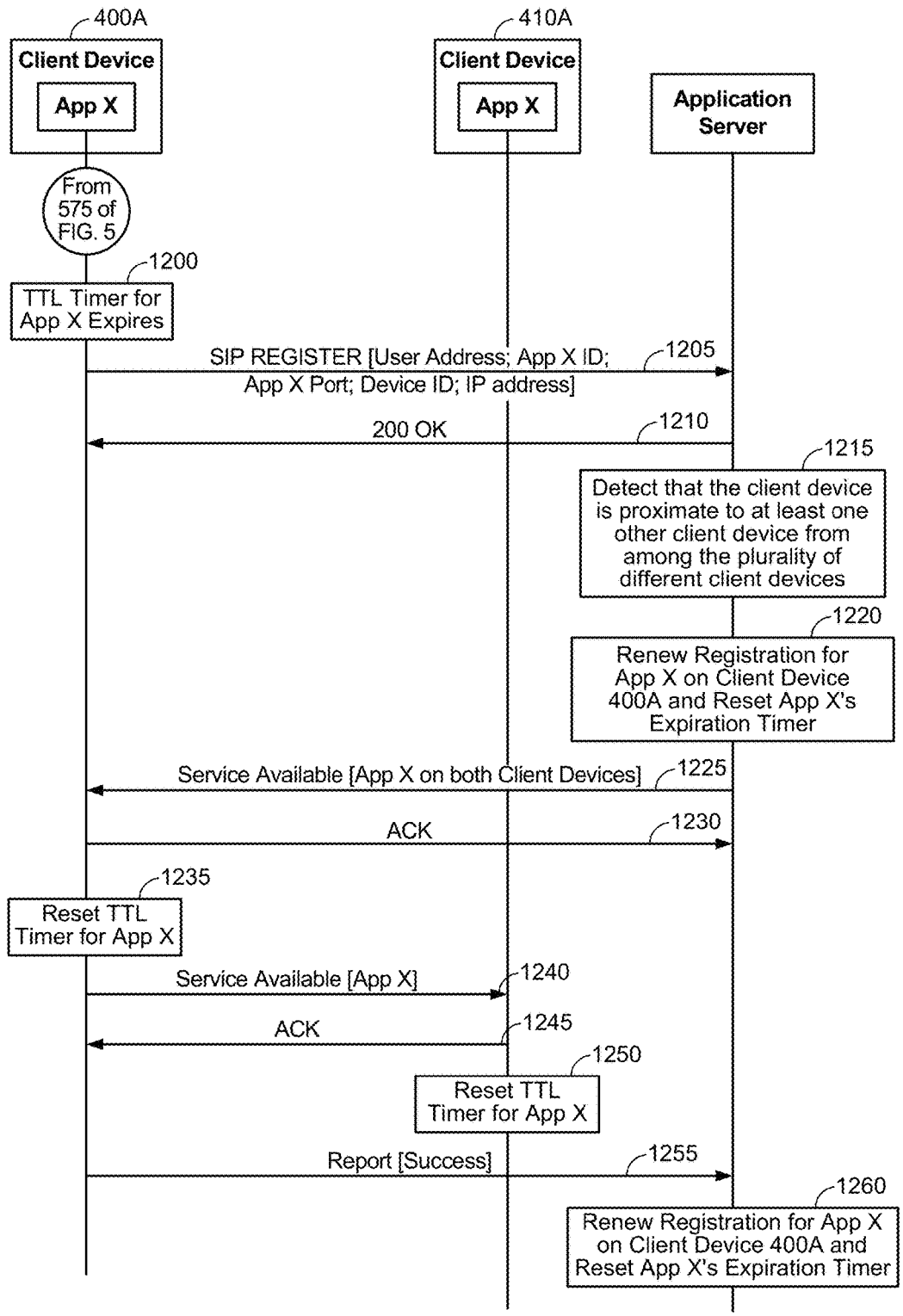
FIG. 12 illustrates an example implementation of the processes of FIGS. 10 and 11 as a continuation of the process of FIG. 5 in accordance with an embodiment of the present invention.

While the embodiments described above with respect to FIGS. 7-9 relate to proximate client devices that coordinate with each other to transmit an aggregated registration request message that requests registration renewals for multiple instances of App X on different devices for the same user, FIGS. 10-12 are directed to a scenario where the server makes its own proximate detection for two or more client devices and then preemptively issues registration renewal(s) for at least one client device that did not expressly request registration renewal by virtue of the at least one client device being proximate to a requesting client device.

FIG. 10 illustrates a process of operating a server (e.g., such as application server 170) in accordance with an embodiment of the invention. Referring to FIG. 10, the server registers a client application (e.g., App X) in association with a given user on each of a plurality of different client devices, 1000. At some later point in time, the server receives a request to renew registration for the client application from one of the registered client devices, 1005. Unlike the registration renewal requests discussed above with respect to FIGS. 7-9, the registration renewal request of 1005 is not an aggregated registration request message and only requests registration renewal for the client application on the client device itself. Instead of simply renewing the application registration for the requesting client device, the server detects that the client device is proximate to at least one other client device among the registered client devices, 1010. The detection of 1010 can be performed in a variety of ways. For example, the server may receive location reports that report location information (e.g., an access point to which the registered client devices are currently connected, latitude longitude coordinates, a report that the at least one other client device was detected via a local communications interface by the client device, etc.) from one or more registered client devices, which are evaluated by the server to determine which of the registered client devices are proximate to each other. For example, client devices connected to the same access point may be deemed proximate, client devices within a threshold distance of each other based on latitude longitude coordinates may be deemed proximate, or client devices that are connected to each other via a local communications interface may be deemed proximate, and so on. In a further example, the detection of 1010 can be implemented at the server based on recent registration history information. For example, if a previous registration message that arrived from a first client device was an aggregated registration request message that also included bundled a registration renewal request for a second client device, the server may assume for a threshold period of time that the first and second client devices are still proximate. In this case, another registration renewal message (aggregated or non-aggregated) received at 1005 from either the first or second client devices received within the threshold period of time may trigger the detection of 1010 via the assumption that the other client device is still proximate. In a further example, the detection of 1010 can be implemented at the server based on heuristic information. For example, at midnight, user(s) are typically asleep with their respective devices remaining in the same position at least until the user(s) wake up, so any devices in proximity at midnight are also likely in proximity at 2 AM, at 4 AM, etc. In this scenario, the server can make certain assumptions regarding proximity, such as two devices positively identified as being proximate at midnight are simply assumed to be proximate for a given amount of time (e.g., until a projected wake-up for the user(s), which can be based on historical information regarding user wake-up times in an historical user-specific manner or a default user wake-up time).

After the detection of 1010, the server determines to preemptively renew the application registration for the at least one other client device that is detected as proximate to the client device that requested the application registration renewal at 1000, 1015. Accordingly, the server transmits, to the requesting client device in response to the determination of 1015, indications that the registrations of the client application for both the client device and the at least one other client device are renewed, along with any associated authentication keys, 1020. The transmission of 1015 acts as an implicit or explicit instruction for the requesting client device to attempt to relay the registration renewal notification to the at least one other client device via the local communications interface, as will be discussed below with respect to 1110 of FIG. 11. At this point, the server may optionally wait for an indication that the client device successfully conveyed the renewal indication(s) for the at least one other client device via a local communications interface before renewing the associated registration(s) for the client application on the at least one other client device, 1025. As an alternative to 1025, the server may renew the registration for the client application on at least one other client device and may reverse the registration renewal if the client device subsequently reports registration renewal notification failure.

FIG. 11 illustrates a process of operating a client device (e.g., such as client device 400A, 410A, 420A or 430A) in accordance with an embodiment of the invention. In particular, FIG. 11 illustrates client-side operations that are performed in conjunction with the server-side operations described above with respect to FIG. 10.

Referring to FIG. 11, at 1100, the client device transmits a request for renewing its registration of a client application with a server. Unlike the registration renewal requests discussed above with respect to FIGS. 7-9, the registration renewal request of 1100 is not an aggregated registration request message. In response to the registration renewal request of 1100, the client device receives indications that the registrations of the client application for both the client device and at least one other client device that is proximate to the client device are renewed, along with any associated authentication keys, 1105.

At 1110, the client device attempts to notify the at least one other client device that is proximate to the client device via a local communications interface that the at least one other client device's registration of the client application is renewed. The client device reports to the server with regard to whether the attempt of 1110 is successful or is a failure, 1115.

FIG. 12 illustrates an example implementation of the processes of FIGS. 10 and 11 performed with respect to client device 400A and 410A of FIG. 4 as a continuation of the process of FIG. 5 in accordance with an embodiment of the present invention. In the embodiment of FIG. 12, it is assumed that client devices 400A and 410A are proximate to each other.

Referring to FIG. 12, at some point after 575, the client device 400A determines that App X's TTL timer which was started at 535 has expired, 1200. Client device 400A then sends a SIP REGISTER message requesting renewal for App X on the client device 400A, 1205 (e.g., similar to 605 of FIG. 6 or 1005 of FIG. 10), and the application server ACKs the SIP REGISTER message, 1210. Instead of simply renewing the App X registration for client device 400A, the application server detects that the client device 400A is proximate to client device 410A which also has App X registered to the same user, 1215 (e.g., as in 1010 of FIG. 10). The application server renews the App X registration for client device 400A and resets the associated App X expiration timer, 1220, and transmits a service available message to client device 400A indicating that App X registrations for both client devices 400A and 410A are renewed, along with updated authentication keys for App X on client devices 400A and 410A, 1225. Client device 400A ACKs the service available message, 1230, and resets its own App X TTL timer, 1235. Client device 400A attempts to notify client device 410A that its App X registration has also been renewed, as well as provide the updated authentication key for App X on client device 410A, 1240 (e.g., as in 1110 of FIG. 11). For example, client device 400A can attempt to forward the service available message to client device 410 via the local communications interface as depicted in FIG. 12.

In the embodiment of FIG. 12, client device 410A ACKs the App X registration renewal notice from client device 400A, 1245, and resets its App X TTL timer, 1250. Client device 400A then reports the successful App X registration renewal notification to the application server, 1255, which renews the App X registration for client device 410A and resets the associated App X expiration timer, 1260.

Figure 13:
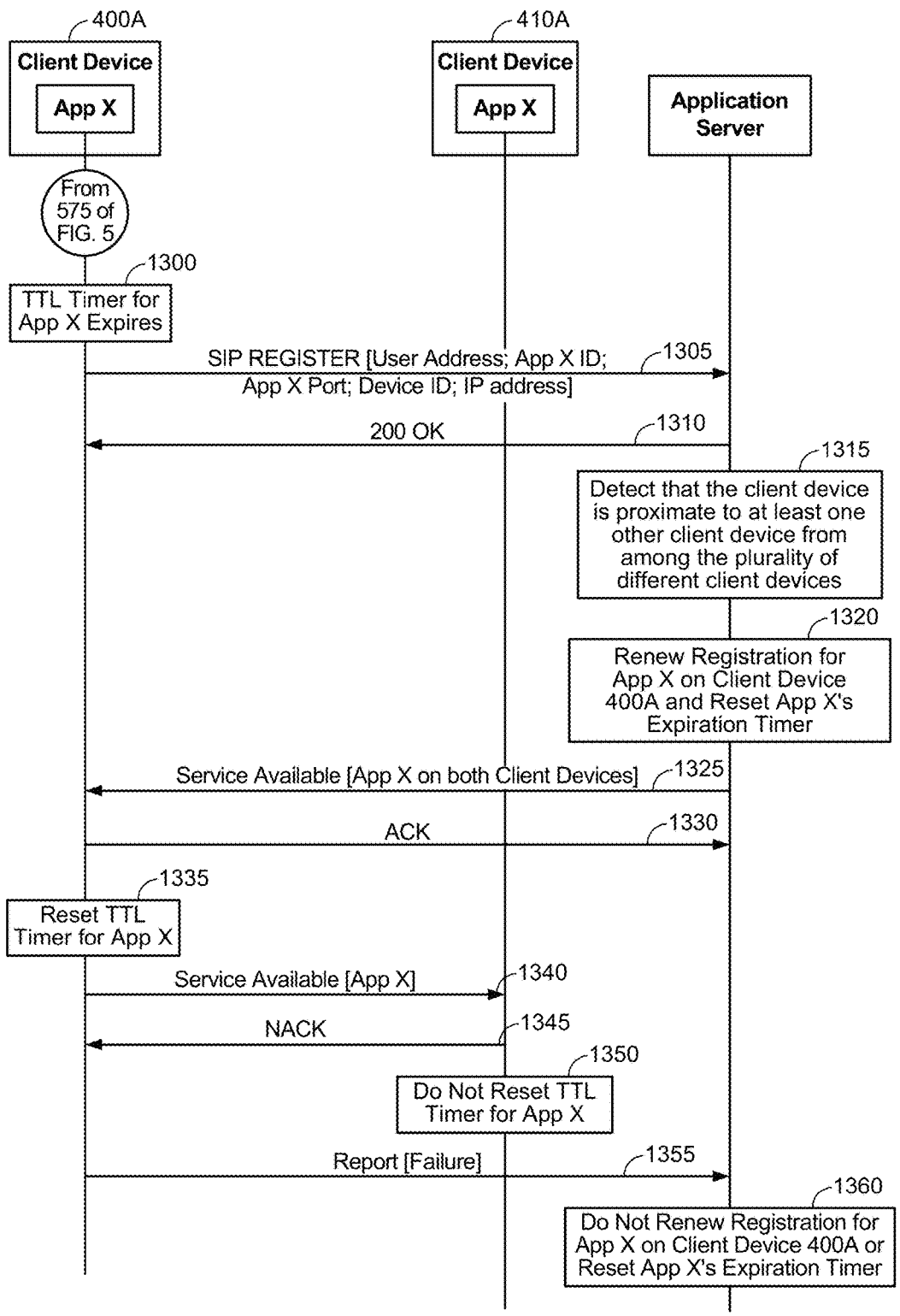
FIG. 13 illustrates another example implementation of the processes of FIGS. 10 and 11 as a continuation of the process of FIG. 5 in accordance with an embodiment of the present invention.

FIG. 13 illustrates another example implementation of the processes of FIGS. 10 and 11 performed with respect to client device 400A and 410A of FIG. 4 as a continuation of the process of FIG. 5 in accordance with an embodiment of the present invention. The process of FIG. 13 is similar to the process of FIG. 12, except that the piggy-backed registration renewal notification for App X does not successfully reach the client device 410A. Similar to FIG. 12, in the embodiment of FIG. 13, it is assumed that client devices 400A and 410A are proximate to each other.

Referring to FIG. 13, 1300-1340 substantially correspond to 1200-1240 of FIG. 12, respectively. At 1345, in contrast to 1245 of FIG. 12, client device 410A NACKs the App X registration renewal notice from client device 400A. The NACK of 1345 can either be an explicit NACK (e.g., an actual message is sent from client device 410A indicating that the transmission of 1340 has failed) or an implicit NACK (e.g., client device 410A fails to ACK the transmission of 1340 within a threshold period of time). Accordingly, the client device 410A does not reset its App X TTL timer, 1350, and the client device 400A reports the App X registration renewal notification failure to the application server, 1355, such that the application server does not renew the App X registration for client device 410A and does not reset the associated App X expiration timer, 1360.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of operating a client device configured to execute a client application that is registered with a server in association with a given user, comprising:
    obtaining a list of client devices to which the client application is registered with the server in association with the given user, wherein the client application remains authorized to access at least one network-based service so long as the client application remains registered with the server;
    detecting, via a local communications interface, that one or more other client devices from the list of client devices are proximate to the client device;
    communicating, in response to a determination to attempt to renew the client application by the client device or the one or more other client devices as indicated by the one or more other client devices initiating the communicating, with the one or more other client devices via the local communications interface;
    identifying, based on the communicating, a given client device that is responsible for sending an aggregated registration request message for renewing the client application's registration with the server for both the client device and the one or more other client devices; and
    performing, based on the identifying, only one of (i) transmitting the aggregated registration request message to the server, or (ii) refraining from transmitting any registration request message to the server for renewing the client application's registration with the server for the client device,
    wherein the client device and the one or more other client devices each correspond to a user device that is operable by the given user.

2. The method of claim 1, wherein the obtaining obtains the list of client devices from the server or from one of the listed client devices.

3. The method of claim 1, wherein the local communications interface corresponds to a direct or point-to-point interface, an indirect interface, a peer-to-peer (P2P) interface, a Bluetooth interface, a WiFi-Direct interface, an LTE-D interface or any combination thereof.

4. The method of claim 1, wherein the client device is identified as the given client device that is responsible for sending the aggregated registration request message, further comprising:
    configuring the aggregated registration request message to include (i) a request for renewing the client device's registration of the client application with the server, and (ii) one or more requests for renewing one or more registrations of the client application with the server for the one or more other client devices; and
    transmitting the aggregated registration request message to the server.

5. The method of claim 4, further comprising:
    receiving a message from the server that indicates that the registrations of the client application on the client device and the one or more other client devices have been renewed; and
    attempting to notify, via the local communications interface, the one or more other client devices that the one or more registrations of the client application with the server for the one or more other client devices have been renewed.

6. The method of claim 1, wherein the client device is not identified as the given client device that is responsible for sending the aggregated registration request message, further comprising:
    refraining from transmitting a registration request message to the server on behalf of the client device based on an expectation that the given client device will be transmitting the aggregated registration request message.

7. The method of claim 6, further comprising:
    receiving, via the local communications interface, a notification from the given client device indicating that the registration of the client application with the server for the client device has been renewed.

8. The method of claim 1, further comprising:
    determining to attempt to renew the client application's registration with the server for the client device,
    wherein the detecting and communicating are performed in response to the determining.

9. The method of claim 1, wherein the determining is based upon expiration of a Time To Live (TTL) timer for the client application for the client device.

10. The method of claim 1, wherein the detecting and communicating are performed in response to a determination made by another client device to attempt to renew the client application's registration with the server for the other client device.

11. The method of claim 1, wherein two or more client devices among the list of client devices are configured to execute different versions of the client application.

12. The method of claim 1, wherein each client device in the list of client devices is configured to execute the same version of the client application.

13. The method of claim 1, wherein, for each client device in the list of client devices, a failure to renew the client application's registration with the server results in deregistration of the client application for an associated client device by the server.

14. The method of claim 1, wherein the given client device is the client device or one of the one or more other client devices.

15. The method of claim 1, wherein the communicating includes the client device and the one or more other client devices exchanging data with each other over a direct or point-to-point wireless communications interface.

* * * * *